United States Patent
Pollack et al.

(10) Patent No.: US 11,209,447 B2
(45) Date of Patent: Dec. 28, 2021

(54) METHODS, SYSTEMS, AND APPARATUS FOR DYNAMIC PICK AND PLACE SELECTION SEQUENCE BASED ON SAMPLE RACK IMAGING DATA

(71) Applicant: Siemens Healthcare Diagnostics Inc., Tarrytown, NY (US)

(72) Inventors: Benjamin S. Pollack, Jersey City, NJ (US); Steven Pollack, Washington Crossing, PA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 417 days.

(21) Appl. No.: 16/316,963

(22) PCT Filed: Jun. 27, 2017

(86) PCT No.: PCT/US2017/039588
§ 371 (c)(1),
(2) Date: Jan. 10, 2019

(87) PCT Pub. No.: WO2018/013346
PCT Pub. Date: Jan. 18, 2018

(65) Prior Publication Data
US 2019/0250180 A1 Aug. 15, 2019

Related U.S. Application Data

(60) Provisional application No. 62/362,535, filed on Jul. 14, 2016.

(51) Int. Cl.
*G01N 35/00* (2006.01)
*B25J 9/16* (2006.01)
(Continued)

(52) U.S. Cl.
CPC .......... *G01N 35/0099* (2013.01); *B25J 9/026* (2013.01); *B25J 9/041* (2013.01);
(Continued)

(58) Field of Classification Search
CPC ......... G01N 35/0099; G01N 35/00732; G01N 2035/041; G01N 2035/0465;
(Continued)

(56) References Cited

U.S. PATENT DOCUMENTS 6,293,750 B1 * 9/2001 Cohen ................ G01N 35/0099
414/744.4
6,974,294 B2 * 12/2005 Pressman ............... B01D 61/18
211/1.55
(Continued)

FOREIGN PATENT DOCUMENTS

CN 1672029 A 9/2005
CN 103068535 A 4/2013
(Continued)

OTHER PUBLICATIONS

Extended EP Search Report dated Jun. 28, 2019 of corresponding European Application No. 17828170.5, 5 Pages.
(Continued)

*Primary Examiner* — Jaime Figueroa (57) ABSTRACT

Methods of operating a gripper are provided. The methods include providing a robot including the gripper, the gripper moveable by the robot and including gripper fingers, providing a sample rack including receptacles accessible by the gripper, at least some of the receptacles adapted to contain specimen containers, providing data, obtained by imaging, regarding the sample rack and the specimen containers therein, and determining, based on the data, an accessible target receptacle for one of a pick operation or a place
(Continued)

operation. Apparatus and systems configured to carry out the methods are provided, as are other aspects.

20 Claims, 6 Drawing Sheets

(51) Int. Cl.
| | |
|---|---|
| *G01N 35/04* | (2006.01) |
| *B25J 9/02* | (2006.01) |
| *B25J 9/04* | (2006.01) |
| *B25J 19/02* | (2006.01) |
| *G05B 19/401* | (2006.01) |
| *B25J 15/02* | (2006.01) |
| *B25J 15/08* | (2006.01) |

(52) U.S. Cl.
CPC ............... *B25J 9/16* (2013.01); *B25J 9/1612* (2013.01); *B25J 9/1664* (2013.01); *B25J 9/1697* (2013.01); *B25J 15/02* (2013.01); *B25J 15/08* (2013.01); *B25J 19/023* (2013.01); *G01N 35/00732* (2013.01); *G05B 19/401* (2013.01); *G01N 2035/041* (2013.01); *G01N 2035/0465* (2013.01); *G01N 2035/0493* (2013.01)

(58) Field of Classification Search
CPC ..... G01N 2035/0493; B25J 9/16; B25J 9/041; B25J 19/023; B25J 15/02; B25J 9/1612; B25J 9/1664; B25J 9/1697; B25J 15/08; B25J 9/026; G05B 19/401
USPC .................................................. 700/245–264
See application file for complete search history.

(56) References Cited

U.S. PATENT DOCUMENTS

| | | | | |
|---|---|---|---|---|
| 7,364,907 | B2* | 4/2008 | Weselak | G01N 35/028 209/522 |
| 8,423,174 | B2* | 4/2013 | Koch | G01N 35/0099 700/214 |
| 8,569,019 | B2* | 10/2013 | Ammann | B01L 7/5255 435/91.2 |
| 2006/0047363 | A1 | 3/2006 | Farrelly et al. | |
| 2007/0059209 | A1* | 3/2007 | Pang | G01N 35/0099 422/72 |
| 2008/0213080 | A1* | 9/2008 | Cachelin | B65G 1/127 414/791.6 |
| 2009/0003981 | A1* | 1/2009 | Miller | F25D 13/06 414/267 |
| 2010/0049358 | A1* | 2/2010 | Koch | G06F 17/00 700/214 |
| 2010/0126286 | A1* | 5/2010 | Self | G01N 35/026 73/863.81 |
| 2013/0065797 | A1* | 3/2013 | Silbert | G01N 1/31 506/39 |
| 2013/0129166 | A1* | 5/2013 | Muller | G01N 35/10 382/128 |
| 2014/0036276 | A1 | 2/2014 | Gross et al. | |
| 2014/0305227 | A1 | 10/2014 | Johns | |
| 2015/0142171 | A1 | 5/2015 | Li et al. | |
| 2015/0273468 | A1* | 10/2015 | Croquette | B01L 3/50825 422/63 |
| 2015/0290795 | A1 | 10/2015 | Oleynik | |
| 2015/0298321 | A1* | 10/2015 | Gross | G01G 19/52 422/67 |
| 2016/0018427 | A1* | 1/2016 | Streibl | G01F 23/00 702/19 |
| 2016/0025757 | A1 | 1/2016 | Pollack et al. | |
| 2016/0124006 | A1 | 5/2016 | Pedain | |
| 2017/0052205 | A1* | 2/2017 | Silbert | G01N 35/026 |
| 2017/0343993 | A1* | 11/2017 | Vivet | G01N 35/026 |
| 2018/0085747 | A1* | 3/2018 | Mandecki | B01L 3/5453 |
| 2020/0025782 | A1* | 1/2020 | Ahlfors | B01L 1/04 |

FOREIGN PATENT DOCUMENTS

| | | |
|---|---|---|
| CN | 103988064 A | 8/2014 |
| CN | 105203780 A | 12/2015 |
| JP | 2004-082239 A | 3/2004 |
| JP | 2014-534447 A | 12/2014 |
| WO | 2013/070756 A2 | 5/2013 |
| WO | 2013/165594 A1 | 11/2013 |
| WO | 2015/191702 A1 | 12/2015 |
| WO | 2016/133919 A1 | 8/2016 |
| WO | 2016/133924 A1 | 8/2016 |
| WO | 2016/133926 A1 | 8/2016 |

OTHER PUBLICATIONS

PCT International Search Report and Written Opinion dated Sep. 8, 2017 (8 Pages).

\* cited by examiner

METHODS, SYSTEMS, AND APPARATUS FOR DYNAMIC PICK AND PLACE SELECTION SEQUENCE BASED ON SAMPLE RACK IMAGING DATA

CROSS-REFERENCE TO RELATED APPLICATIONS

This application claims priority to U.S. provisional application Ser. No. 62/362,535 filed on Jul. 14, 2016, the contents of which is incorporated herein by reference in its entirety.

FIELD

The present disclosure relates generally to methods and apparatus adapted to pick and place a specimen container from and to a sample rack in systems for processing biological liquids.

BACKGROUND

In medical testing and processing, the use of robotics may minimize exposure to, or contact with, biological liquid samples (otherwise referred to herein as "specimens") and/or may significantly increase productivity. For example, in some automated testing and processing systems (e.g., clinical analyzers), specimen containers (such as test tubes) may be transported from and to sample racks (sometimes referred to as "cassettes") and from and to a testing or processing location of a testing or processing apparatus.

Such transportation may be accomplished by the use of an automated mechanism, such as a robot having a coupled gripper. The gripper may have opposed gripper fingers that are configured to grasp respective specimen containers during transport. The specimens may be of varying size (e.g., height and/or diameter) or type. The gripper may be moved in two or more coordinate directions by the robot. In this way, specimen containers (containing a specimen to be tested or processed) may be gripped by the gripper, and then moved from one location to another.

For example, in a pick operation, the robot gripper may be moved to above a theoretical center location of a receptacle of a sample rack and, with gripper fingers fully open, lowered to a specified height and then closed to grip the specimen container. This is followed by raising the gripper to pull the specimen container from the receptacle. In a place operation, the gripper, with specimen container in its grasp, may be moved over the center of a sample rack receptacle, and lowered towards the receptacle to place the specimen container to a desired depth, and then the gripper fingers are fully opened to release the specimen container. This is followed by raising the gripper. Thus, using these pick and place operations, specimen containers may be moved from and to numerous receptacles of the sample rack. However, to maximize machine footprint usage, the receptacles in such sample racks are very tightly spaced.

Accordingly, methods and apparatus that may improve efficiency of pick and place operations in testing and processing systems are sought after.

SUMMARY

In one method embodiment, an improved method of operating a gripper is provided. The method includes providing a robot including the gripper, the gripper moveable in a coordinate system by the robot and including gripper fingers, providing a sample rack including receptacles accessible by the gripper, at least some of the receptacles adapted to contain specimen containers, providing data, obtained by imaging, regarding the sample rack and the specimen containers, and determining, based on the data, an accessible target receptacle for one of a pick operation or a place operation.

In a system embodiment, a gripper positioning system is provided. The gripper positioning system includes a robot including the gripper, the gripper moveable in a coordinate system by the robot and including gripper fingers, a sample rack including receptacles accessible by the gripper fingers, at least some of the receptacles containing specimen containers, and a controller coupled to the robot and operatively configured to: access data obtained from one or more images regarding the sample rack and the specimen containers, the data including population data and configuration data, and determine, based on the population data and configuration data, an accessible target receptacle for one of a pick operation or a place operation.

In an apparatus embodiment, a gripper positioning apparatus is provided. The gripper positioning apparatus includes a robot including the gripper, the gripper moveable in a coordinate system by the robot and including gripper fingers, a controller coupled to the robot and operatively configured to access data obtained from one or more images, regarding the sample rack and the specimen containers, and determine, based on the data, an accessible target receptacle for one of a pick operation or a place operation.

Still other aspects, features, and advantages of the present disclosure may be readily apparent from the following detailed description illustrating a number of example embodiments, including the best mode contemplated for carrying out the present disclosure. The present disclosure may also be capable of different embodiments, and its several details may be modified in various respects, all without departing from the scope of the present disclosure. Accordingly, the disclosure is to cover all modifications, equivalents, and alternatives falling within the scope of the disclosure as defined in the appended claims.

DETAILED DESCRIPTION

In robots, such as those used to accomplish robotic pick and place operations in clinical analyzers or other testing or processing systems (e.g., centrifuges, cold storage areas), jams, collisions, and/or jarring of specimen containers can occur from time-to-time.

Figure 1:
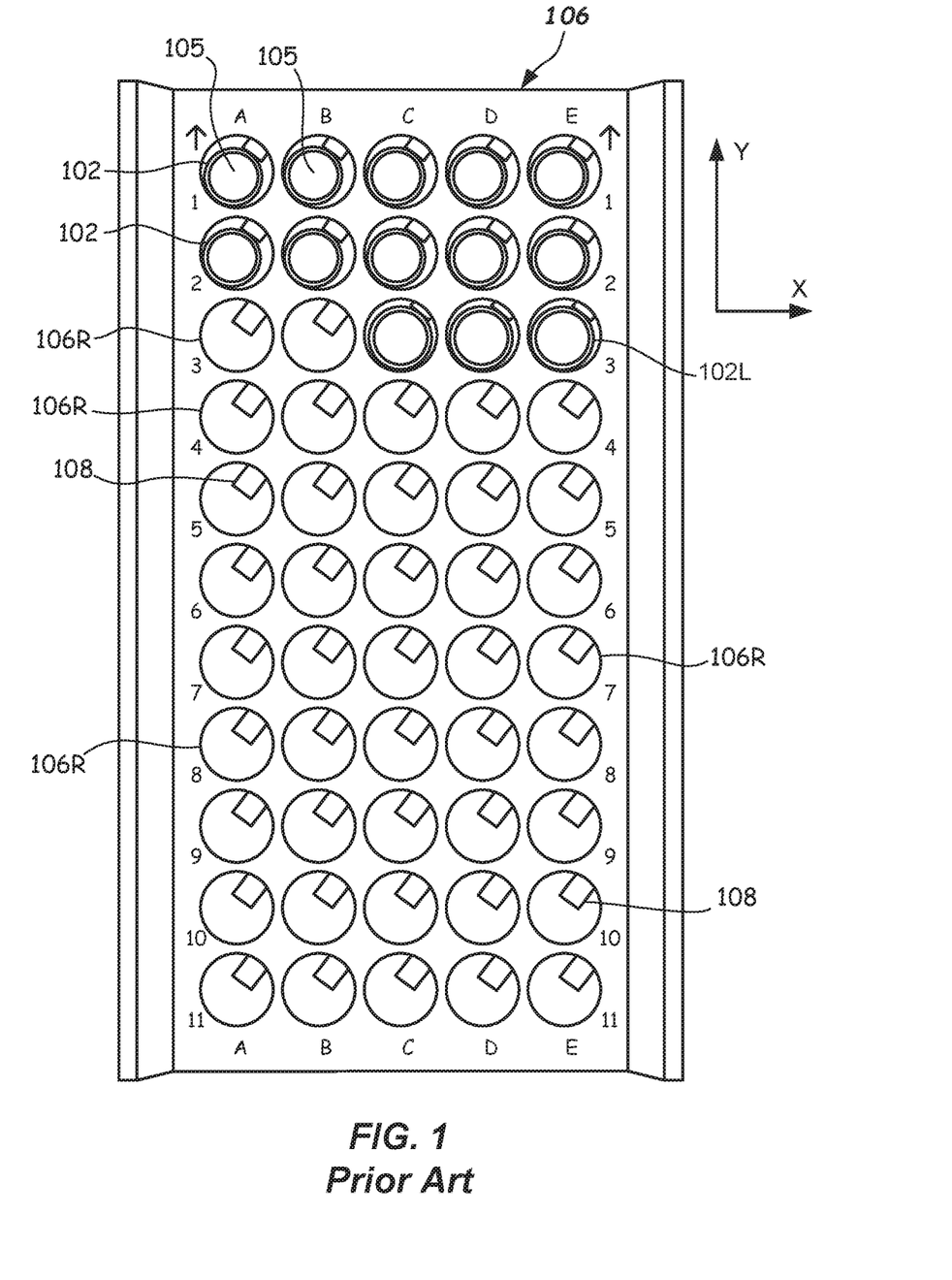
FIG. 1 illustrates a schematic top view of a sample rack including specimen containers according to the prior art.

In particular, as is shown in FIG. 1, specimen containers 102, 102L (e.g., blood collection tubes) used in automated in vitro diagnostics (IVD) equipment are typically provided in an open-topped (de-capped) condition and filled with a biological fluid specimen 105 (a few labeled), i.e., a biohazardous liquid (e.g., blood, blood serum or plasma, urine, interstitial fluid, cerebral fluid, spinal fluid, or other bodily fluids). The specimen containers 102, 102L are stored in a generally vertical orientation within receptacles 106R (a few labeled) within a sample rack 106 (the first two and a half rows populated with specimen containers 102, 102L).

To maximize the use of the equipment footprint, the receptacles 106R of the sample rack 106 are very closely spaced. To accommodate specimen containers 102 of various diameters, sometimes springs 108 (a few labeled), such as one or more leaf-type springs, can be placed in each receptacle 106R in an attempt to either center the specimen container 102, or to force the specimen container 102 against a defined wall of the receptacle 106R (as shown), all while generally maintaining the vertical orientation of the specimen container 102.

However, due to mechanical tolerances and placement of the specimen containers 102, each specimen container 102 may lean away from a true vertical orientation to some extent in one or more directions (e.g., X and/or Y as shown), thereby causing a reduction in the expected tube-to-tube clearance. Furthermore, because varying-diameter specimen containers 102 are often processed on a given piece of equipment at the same time (e.g., Row 3 shown containing some specimen containers 102L that have a relatively-larger diameter as compared to specimen containers 102 contained in Rows 1 and 2), the clearance between adjacent specimen containers 102, 102L in the sample rack 106 may vary from receptacle 106R to receptacle 106R based upon tube size and direction of lean. Furthermore, the offset due to the presence of springs 108 may place the center of the specimen container 102, 102L at a position other than the center of the receptacle 106R. Similarly, some receptacles 106R may be empty.

The close spacing of the receptacles 106R, combined with the desire for high throughput of the IVD equipment, may result in occasional unwanted contact between specimen containers 102, 102L (e.g., jams, collisions, and/or jarring) and the robot gripper and/or gripper fingers during processing. Such contact may slow down automated processing, as damage caused by the contact may have to be corrected by manual operator intervention. For example, such contact can, in the some extreme cases, result in tube breakage, spills, and/or loss of specimen, all possibly resulting in downtime for remediation/cleanup.

In the prior art, the order in which specimen containers 102 are picked and/or placed in the sample rack 106 is pre-determined using simple row-by-row sequential picking and/or placing based on simple picking algorithms. This pre-determined order of selection does not take into account possible differences in placement (e.g., offset), size (e.g., diameter or height), or even type of specimen containers 102, 102L that are resident within receptacles 106R of sample racks 106. These differences, if not accounted for, may result in contact or may cause obstruction of the gripper fingers and may make it more difficult for the gripper fingers to access the specimen containers 102, 102L in the pre-determined order without causing possible damage to the specimen (e.g., spillage) or requiring operator intervention.

In view of the foregoing, one or more embodiments of the disclosure provide methods, systems, and apparatus to dynamically (on the fly) determine a sequence of picking accessible specimen containers, or placing specimen containers in a target, accessible receptacle, based on data obtained by imaging the sample rack (i.e., dynamic selection of pick and/or place order). The data obtained by imaging may include sample rack population data and/or specimen container configuration data. Population data is data regarding the presence or absence of neighboring specimen containers in receptacles of the sample rack, and more particularly, around a particular target receptacle. Configuration data is data concerning the orientation and/or size of specimen containers surrounding the target receptacle, as well as the orientation and/or size of the target specimen container itself. Population data and/or configuration data is made available for each receptacle 106R in a sample rack 106 after the sample rack 106 has been imaged via a sample rack imaging system, wherein such sample rack imaging systems are known in the prior art.

According to one or more embodiments, vision data (e.g., configuration and/or population data) may be used to dynamically adjust a pick and/or place order or sequence. In one embodiment, the order in which specimen containers 102, 102L are picked by the gripper fingers may be adjusted based on configuration and/or population data obtained by imaging. In another embodiment, the order in which specimen containers 102, 102L are placed by the gripper fingers may be adjusted based on configuration and/or population data obtained by imaging.

Method, apparatus, and systems in accordance with one or more embodiments may take into account the population data of specimen containers 102 in the sample rack 106 and/or configuration data of specimen containers 102 in the sample rack 106 to dynamically determine a desired pick and/or place order.

For example, method, apparatus, and systems may take into account population data such as whether or not surrounding receptacles 106R contain specimen containers 102 or are empty. Similarly, one or more embodiments may take into account configuration data regarding size (e.g., diameter and/or height) of one or more of the surrounding specimen containers, offset of neighboring specimen containers towards or away from a certain target specimen container, the tube type of the target specimen container (e.g., capped tube, uncapped tube, tube top sample cup, and the like), and any offset of a target specimen container (in the case of a pick operation).

This ability to dynamically choose the order in which specimen containers 102 are picked and/or placed by the gripper may dramatically reduce the propensity for contact (e.g., jams, collisions, and/or jarring) and thus reduce damage to the specimen container 102, 102L and/or reduce biological fluid specimen 105 spillage and loss. This may reduce IVD instrument downtime as well as the need for operator intervention.

These and other aspects and features of embodiments of the disclosure will be described with reference to FIGS. 2-6 herein.

Figure 2:
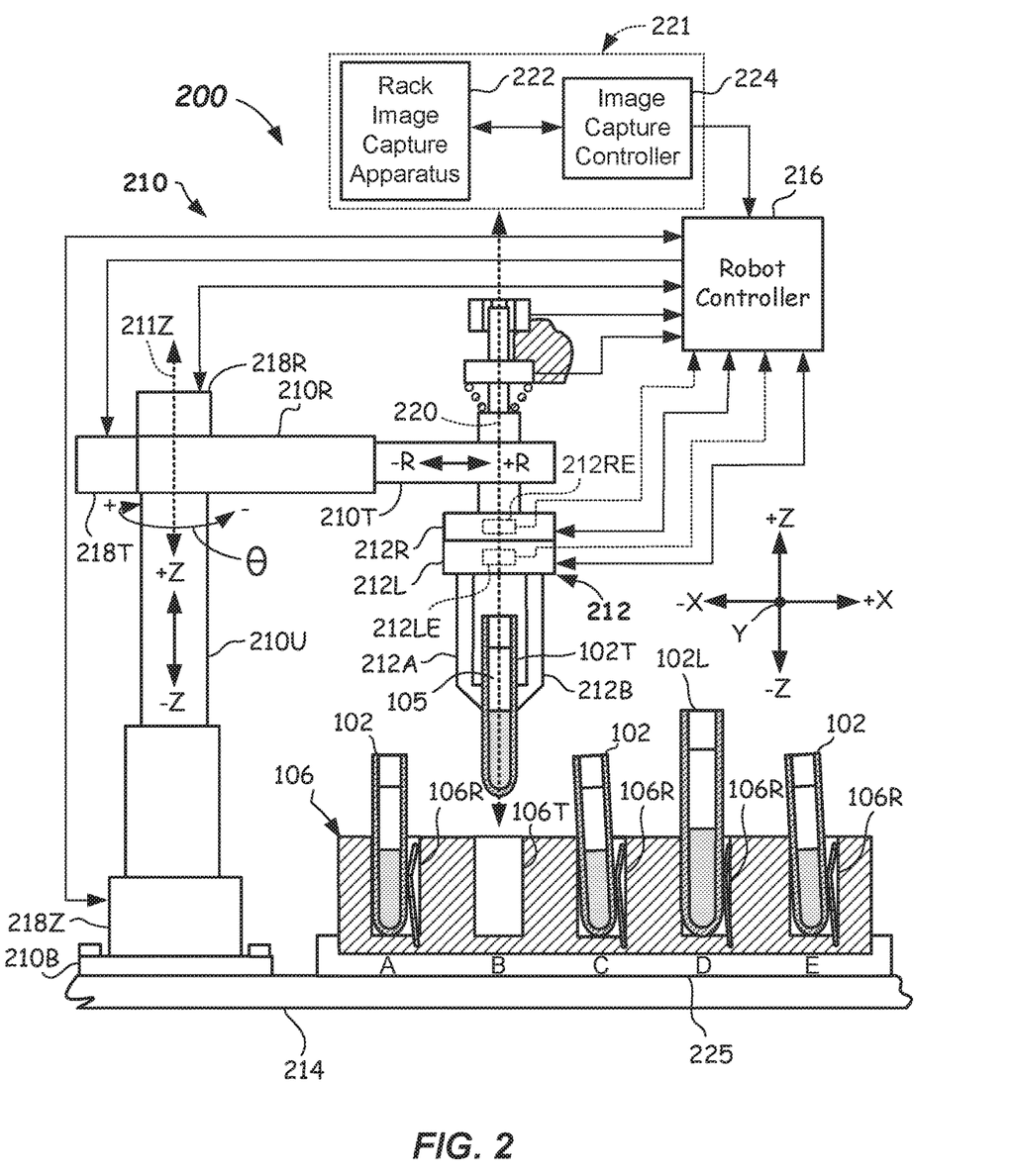
FIG. 2 illustrates a schematic side view of a gripper positioning system configured to perform a dynamic gripper finger positioning method according to one or more embodiments.

In accordance with one or more system embodiments, referring to FIG. 2, a gripper positioning system 200 is shown and described. The gripper positioning system 200 includes a robot 210 that is useful for grasping and transferring a target specimen container 102T, such as blood collection vessel, vial, or the like, from a first location to a second location. The gripper positioning system 200 may be used in any testing instrument or device, such as an automated clinical analyzer, assaying instrument, or other processing device such as a centrifuge, where specimen containers 102, 102L containing biological fluid specimen 105 are moved to or from a sample rack 106.

For example, the robot 210 may move the target specimen container 102T from the sample rack 106 to a specimen container carrier 532 (e.g., a puck—FIG. 5) moveable on a track 540, which moves the specimen container 102 to an instrument or equipment for testing or processing. In one or more embodiments, the testing instrument or equipment may be used for determining a constituent component (e.g., an analyte concentration) in the biological fluid specimen 105 contained in the specimen container 102 or otherwise performing processing thereon. The track 540 may include one or more offshoots 540A providing the opportunity for specimen container carriers 532 to branch off from a main channel 540B.

Again referring to FIG. 2, the robot 210 includes a gripper 212 coupled to a moveable part of the robot 210, such as a moveable arm or portion of a gantry. For example, the robot 210 may be an R, theta, Z robot as shown in FIG. 2. Alternatively, the robot may be a gantry robot 510 as shown and described relative to FIG. 5 herein. In each case, the robot 210, 510 moves a gripper 212 in a coordinate system (e.g., in X, Y, and Z). The robot 210 shown in FIG. 2 may include a base 210B that may be coupled to a frame 214 of the testing instrument or equipment, an upright portion 210U configured to move vertically (in the +Z and −Z directions) along a vertical axis 2112, a telescoping portion 210T configured to move radially (in the +R and −R directions), and a rotary portion 210R configured to move rotationally about the vertical axis 2112 (in the +θ and −θ directions). "Gripper" as used herein means any member coupled to a robot component (e.g., coupled to a robot arm or gantry member) that is used in robotic operations to grasp and move an article (e.g., a specimen container 102) from one location to another, so as to carry out a pick and/or a place operation. For example, the robot 210, 510 may be used to place the target specimen container 102T into a target receptacle 106T in the sample rack 106, or pick the target specimen container 102T from the target receptacle 106R in the sample rack 106.

The gripper 212 may include two gripper fingers 212A, 212B that are moveable relative to one another, may be generally opposed to one another, and are adapted to grasp articles, such as specimen containers 102 (e.g., blood collection tubes or vials). The gripper fingers 212A, 212B may be driven to open and close by an actuation mechanism 212L coupled to each of the gripper fingers 212A, 212B. Actuation mechanism 212L may be any suitable mechanism that moves the gripper fingers 212A, 212B in opposite directions. The actuation mechanism 212L may be linearly acting to move each gripper finger 212A, 212B in linear translation or otherwise pivot the gripper fingers 212A, 212B. The relative amount of movement of the gripper fingers 212A, 212B may be the same (but in opposite directions) or a different amount. The gripper fingers 212A, 212B may open and close along any suitable direction in an X-Y plane (e.g., in the X or Y direction or combinations thereof).

In some embodiments, a rotary actuator 212R may be provided that is configured and operable to rotate the gripper fingers 212A, 212B to any prescribed rotational position/orientation. Thus, a line of action of opening and closing of the gripper fingers 212A, 212B can be rotated to coincide with areas on the sample rack 106 that meet a threshold minimum clearance. The areas in the sample rack 106 that are determined to meet the threshold minimum clearance may be determined by imaging. In particular, receptacles 106R that meet the threshold minimum clearance may be selected as target receptacles 106T for pick and/or place operations thereat. The selection may be based on population and/or configuration data obtained by imaging. The +X, −X, +Y and −Y directions as referred to herein may be as shown. The Y direction is into and out of the paper, as shown.

In more detail, the actuation mechanism 212L may be driven by an electric, pneumatic, or hydraulic servo motor, or the like, that is coupled to the gripper fingers 212A, 212B. The gripper fingers 212A, 212B may move along any slide mechanism so that they may be constrained to linear motion. Other suitable mechanisms for causing gripping action of the gripper fingers 212A, 212B may be used. Likewise, in some embodiments where rotational capability is provided, the rotary actuator 212R may be configured and operable to rotate the gripper fingers 212A, 212B. The rotary actuator 212R may be an electric, pneumatic, or hydraulic servo motor, or the like.

The actuation mechanism 212L and the rotary actuator 212R may be driven responsive to drive signals from a robot controller 216. One or more linear position encoders 212LE and/or rotational encoders 212RE may be included to provide position feedback concerning the extent of opening of the gripper fingers 212A, 212B and/or the rotational orientation of the gripper fingers 212A, 212B. Furthermore, although two gripper fingers 212A, 212B are shown, embodiments of the present disclosure are equally applicable to a gripper 212 having more than two gripper fingers 212A or 212B. Other gripper 212 types may be used, as well. The robot 210, 510 may be any suitable robot type capable of moving the gripper 212 in space (e.g., three-dimensional space) to transport the specimen containers 102.

Again referring to FIG. 2, in one or more embodiments, the robot 210 may include a rotational motor 218R adapted to rotate a rotary portion 210R to a desired angular orientation in a rotational direction (e.g., +/−θ). The robot 210 may also include a vertical motor 218Z coupled to the upright portion 210U and that may be adapted to move the gripper 212 in a vertical direction (e.g., along the vertical axis 2112, shown dotted). In one or more embodiments, the robot 210 may include a translational motor 218T adapted to impart translational motion to the gripper 212 coupled to the rotary portion 210R (e.g., along the +/−R direction). However, although an R, theta, Z robot is shown, other suitable robot types, robot motors and mechanisms for imparting X, Y, R, θ, and/or Z motion or other combinations may be provided. Suitable position feedback mechanisms may be provided for each degree of motion (X, Y, R, θ, and/or Z) such as from linear and/or rotation encoders.

In one or more embodiments, the robot 210 may be used to accomplish three-dimensional motion of the gripper 212 in a coordinate system (e.g., X, Y, and Z) so that the specimen containers 102, 102L may be placed in, or removed from, target receptacles 106T of the sample rack 106 or placed in or removed from other positions in testing instrument or processing equipment. Optionally, the robot 210 may accomplish rotation of the gripper 212 about the gripper rotational axis 220, so that the gripper fingers 212A, 212B may be precisely rotationally oriented relative to a target receptacle 106T of the sample rack 106.

The robot controller 216 may include a suitable microprocessor, memory, power supply, conditioning electronics, circuitry and drivers adapted to carry out and control the robot motions and to control position of the gripper 212 in the X,Y,Z coordinate system, as well as control an extent of gripper finger 212A, 212B opening distance and/or rotational orientation.

In FIG. 2, a sample rack imaging system 221 may be provided in the gripper positioning system 200 to capture images of the sample rack 106. Sample rack imaging system 221 may include a rack image capture apparatus 222 and an image capture controller 224. In particular, the rack image capture apparatus 222 (e.g., a digital camera) may be placed at any suitable location. In one or more embodiments, multiple images of the sample rack 106 may be obtained from multiple perspectives. For example, the rack image capture apparatus 222 may be placed above a moveable sample rack loading drawer 225, which may be moveable relative to the frame 214. The sample rack 106 may be supported by the moveable sample rack loading drawer 225 and moved into the testing instrument or processing equipment to a position accessible by the robot 210. During that movement, the rack image capture apparatus 222 may take multiple digital images of a top of the sample rack 106. Other means for capturing images may be used.

Image processing software stored in the image capture controller 224 may receive and process the multiple digital images. From the images, data may be produced including population data and/or configuration data. The population data and/or configuration data may be accessed by the robot controller 216. Access may be either through a download of the data from the image capture controller 224 or by gaining access to a database resident on the image capture controller 224.

Optionally, the robot controller 216 and image capture controller 224 may be combined in one common controller and configured to process the images captured by the rack image capture apparatus 222 and also control the motion and operation of the robot 210 and gripper 212. Further details of the sample rack imaging system 221 and image capture controller 224 may be found in U.S. Pat. Pub. No. US2016/0025757 filed Mar. 14, 2014, to Pollack et al. entitled "Tube Tray Vision System"; PCT Application Pub. No. WO2015/191702 filed Jun. 10, 2015, and entitled "Drawer Vision System"; PCT Application No. PCT/US2016/018100 filed Feb. 16, 2016, and entitled "Locality-Based Detection Of Tray Slot Types And Tube Types In A Vision System"; PCT Application No. PCT/US2016/018112 filed Feb. 16, 2016, and entitled "Locality-Based Detection Of Tray Slot Types And Tube Types In A Vision System"; and PCT Application No. PCT/US2016/018109 filed Feb. 16, 2016, and entitled "Image-Based Tube Slot Circle Detection For A Vision System."

In more detail, population data refers to data on which of the receptacles 106R in the sample rack 106 are empty, and which contain a specimen container 102 therein. For example, as shown in FIG. 2, population data would indicate that target receptacle 106T labeled "B" is empty, and receptacles 106R labeled "A," "C," "D," and "E" all contain specimen containers 102, 102L. Population data, alone or in combination with configuration data, may be used to select the next target specimen container 102T for a pick operation or target receptacle 106T for a place operation.

Configuration data is defined herein as information on the geometry and/or orientation of one or more specimen containers 102, 102L resident in the sample rack 106. Configuration data may include maximum specimen container outer diameter, offset distance of a top of the specimen container 102, 102L relative to a center of the receptacle 106R where it resides, height of the specimen container 102, 102L, or tube type (e.g., capped tube, uncapped tube, including a tube top sample cup, and the like).

For example, configuration data may indicate that specimen container 102L has a relatively large diameter, that the specimen container 102 is offset in the X and/or Y directions due to the action of a spring (e.g., spring 108) or because the specimen container 102, 102L is leaning in the receptacle 106R. The configuration data obtained from imaging may also indicate a specimen container 102 having a relatively small diameter or intermediate diameter, and may provide a distance between the centers of the target specimen container 102T and any neighboring specimen containers 102, 102L, for example. The sizes, offsets, and clearances may be obtained by first identifying the geometrical features in the image and then counting pixels.

Population data, configuration data, or combinations of the two are at least partially used to determine a target receptacle 106T that is deemed to be accessible by the gripper fingers 212A, 212B. The target receptacle 106T may be selected by preliminarily surveying the available receptacles 106R prior to either a pick operation or a place operation.

An accessible target receptacle is a receptacle (e.g., target receptacle 106T) which has been determined to meet a threshold minimum clearance. The threshold minimum clearance is predetermined and measured along an available line of action relative to the target specimen container 102T. For example, referring to FIG. 3A, consider that specimen container 102T in the target receptacle 106T is the "target specimen container," i.e., in a pick operation, the specimen container 102 that is desired to be picked by the gripper fingers 212A, 212B. Before the specimen container 102T is picked by the gripper fingers 212A, 212B, though, the method may determine whether or not the target receptacle 106T, in which the target specimen container 102T is received, is accessible. By determining this, the risk of jams, contact between neighboring specimen containers, spillage, etc. is reduced, thus increasing efficiency of the automated testing instrument or processing equipment.

Figure 3A:
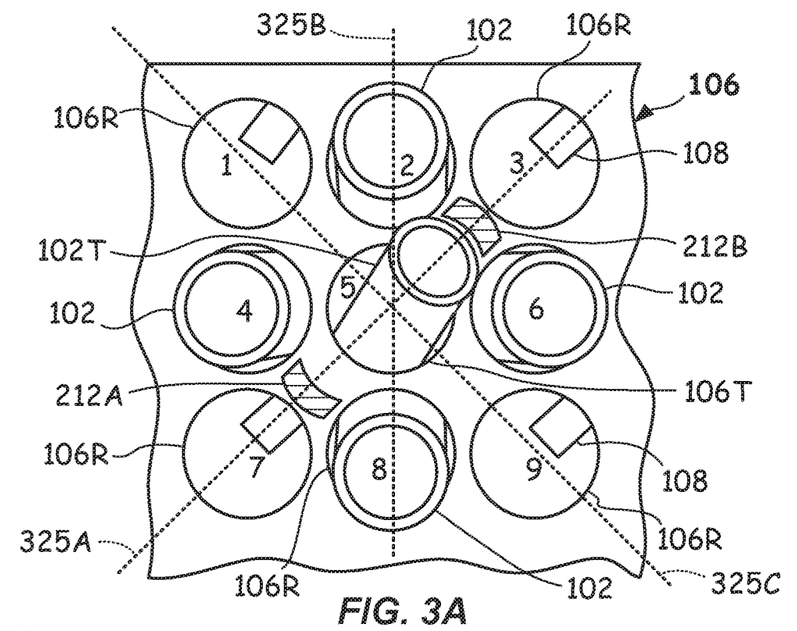
FIG. 3A illustrates a partial top plan view of a sample rack including a target specimen container surrounded by some empty and some full receptacles, shown in a configuration where the gripper fingers are opened (separated) by an intermediate distance according to one or more embodiments.

To determine if the target receptacle 106T is accessible (i.e., if it meets the threshold minimum clearance), population data and/or configuration data for the target specimen container 102T and the surrounding specimen containers 102 and receptacles 106R may be accessed and used. In this case, as shown in FIG. 3A, configuration data for the specimen containers 102 located in the number 2, 4, 6, and 8 receptacles 106R in the sample rack 106, is obtained and analyzed. Likewise, population data may be used to determine that number 1, 3, 7 and 9 receptacles 106R are empty.

The analysis can be carried out by selecting a first receptacle as a potential target receptacle 106T and testing whether the threshold minimum clearance is available along any available line of action. For example, in a fixed gripper design, i.e., without rotational capability, only the clearance along the line of action 325A for that receptacle 106R will be surveyed.

The method of selection of the receptacle for testing against the threshold may be as simple as moving from receptacle to receptacle until one that meets the threshold minimum clearance is found. In the case where multiple lines of action (e.g., lines of action 325A-325C) are available because the gripper 212 has rotation capability, each line of action (325A-325C) for a test receptacle 106R may be tested individually against the threshold minimum clearance. As soon as one clearance value falls above the threshold, the pick or place may be carried out. If the receptacle 106R does not meet the threshold minimum clearance, then another receptacle 106R is surveyed to see if it meets the threshold minimum clearance. This continues until a target receptacle 106T is found to meet the minimum threshold clearance.

The population data for receptacles 106R surrounding the target receptacle 106T may indicate which of the receptacles 106R surrounding the target receptacle 106T contain a specimen container 102, 102L. In cases where there is an empty receptacle 106R along a line of action 325A, such as at numbers 1, 2, 3, 7 and 9, those clearances on that side of the target specimen container 102T may be determined to be above the threshold, automatically. Thus, immediately, that line of action 325A may be selected. The opening distance measured between the specimen container contact surfaces of the gripper fingers 212A, 212B may be set to a maximum. Line of action 325A may be selected over line of action 325C because the direction of offset of the top of the specimen container is such that gripping it along line of action 325A may have a high probability of righting the orientation from leaning to a vertical orientation, i.e., to right a leaning target specimen container 102T.

Moreover, the configuration data may indicate which ones of the neighboring specimen containers 102, 102L is a specimen container 102L of a relatively large diameter. The configuration data may also indicate that the target specimen container 102T is leaning (i.e., is offset from the center of the target receptacle) or otherwise offset, thus reducing or increasing a clearance between the target specimen container 102T and any surrounding specimen containers 102, 102L.

The configuration data may also indicate the tube type of the target specimen container 102T. Knowing the tube type is important in situations where the clearance between two specimen containers 102 is very close to the minimum threshold clearance, making it difficult to determine whether the receptacle 106R is actually accessible or not. For certain tube types, smaller threshold clearances may be allowed as that tube type is sturdier, and for other tube types, such as tube-top sample cups, larger threshold clearances may be used as the tube type is more delicate. Thus, the threshold clearance may be selected based on the type of specimen container 102 present in the target receptacle 106T or in the surrounding receptacles 106R in some embodiments.

From the imaging data, it may be determined if a target receptacle 106T is accessible, i.e., that it can be properly accessed by the gripper fingers 212A, 212B (e.g., without contact therewith) or if it is blocked from access. Blocked from access means that the gripper fingers 212A, 212B cannot be inserted without substantial possibility of contact with one or more specimen containers 102, 102L surrounding the target specimen container 102T. For a pick operation, a receptacle 106R can be determined to be blocked after all possible lines of action have been analyzed and none allow for the minimum threshold clearance between the specimen container 102 within the receptacle 106R and one of the neighboring specimen containers 102. A receptacle 106R can be determined to be accessible if one of the lines of action provides a minimum threshold clearance between the receptacle 106R and the neighboring specimen containers 102. The minimum threshold clearance may be provided in some instances by adjusting the gripper 212 in X and/or Y directions. In other instances, the minimum threshold clearance may be provided by adjusting the opening distance between the gripper fingers 212A, 212B. In some embodiments, adjustments to both the location of the gripper 212 in X and/or Y directions together with adjustments the opening distance between the gripper fingers 212A, 212B may be carried out to provide the minimum clearance.

Figure 3B:
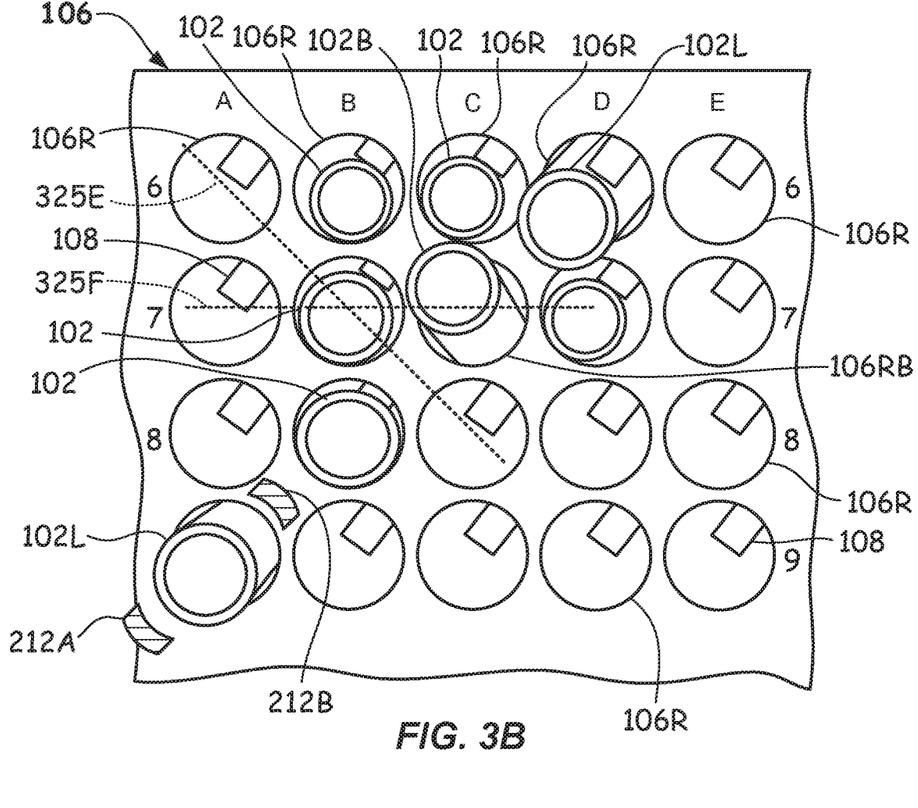
FIG. 3B illustrates a partial top plan view of a sample rack including specimen containers in receptacles, shown in a configuration where the gripper fingers are opened (separated) by an intermediate distance according to one or more embodiments.

If the target receptacle 106T is not accessible, a strategy may be developed, based upon the imaging data, wherein the strategy involves selecting neighboring specimen containers 102, 102L that are accessible and removing them first, so as to make the target receptacle 106T accessible. For example, as shown in FIG. 3B, specimen container 102B shown in the receptacle 106RB labeled C7 is effectively blocked. Blocking is determined when no available line of action includes the minimum clearance regardless of gripper rotational orientation, gripper opening distance, or X or Y positioning. Specimen container 102B is deemed blocked because specimen containers 102, 102L in receptacles 106R labeled B7, B6, C6, D6 are too close to meet the minimum clearance on one side of the blocked specimen container 102B. Thus, to be able to pick blocked specimen container 102B, it must first be unblocked.

By removing an unblocked specimen container 102 in an adjacent neighboring receptacle labeled A7 along line of action 325E, this may effectively "unblock" the target receptacle 106RB. The target receptacle 106RB may then be made accessible and may then be able to be picked along a line of action (e.g., along line of action 325F, for example). Optionally, specimen container 102 in receptacle 106R labeled B6 may have been removed to provide unblocking the blocked specimen container 102B. In each case, there may be many options for unblocking a blocked receptacle 106RB.

The method may, in one embodiment, test in a round robin fashion whether each removal may unblock the target receptacle 106RB. As soon as one is found that will unblock, it may be removed and the previously blocked specimen container 102B, now being unblocked, may be picked. In other embodiments, where multiple unblocking options are available, removal of a specimen container 102, 102L that will reveal a line of action with the greatest clearance may be selected.

For each blocked receptacle 106RB, embodiments of the method may search in a sequence, going clockwise or counterclockwise from any starting location, and survey whether any of the neighboring specimen containers 102, 102L may be removed, and if so, would that free up a line of action effectively enabling the unblocking the blocked specimen container 102B by removal thereof. In some embodiments, all of the blocked receptacles 106RB in the sample rack 106 may be identified based on the imaging data, and each blocked receptacle 106RB may be given precedence over unblocked receptacles 106R so that a neighboring specimen container 102, 102L may be selected in an effort to unblock the blocked condition. Any number of schemes may be implemented to unblock blocked receptacles.

In some embodiments, pick operations may take place in an ordered sequence, such as row-by-row, column-by-column, or in any other ordered pattern, and when a blocked receptacle 106RB is detected, then a pick move may be made to attempt to unblock the blocked receptacle 106RB. If no move is available at that time, then the ordered sequence simply continues until a move is available.

In some embodiments, after a first pick or place is made, the system and method can be used to analyze the rest of the sample rack 106 and create a comprehensive pick and place strategy that takes into account population and/or configuration data. This pick or place order may be determined rapidly, and while the first accessible specimen container 102 is being picked. The system may determine all accessible specimen containers 102 and all "blocked" specimen containers 102. In some embodiments, all the accessible specimen containers 102 may be picked first, and then it may be determined which of the specimen containers 102 that were once considered "blocked" have become "unblocked." These "unblocked" specimen containers 102 are now accessible, and may be picked. This may be repeated until all of the specimen containers 102 have been "unblocked," deemed accessible, and picked.

In some embodiments, rank ordering the receptacles 106R may also be used to determine the order in which specimen containers 102 are picked. Referring now to FIGS. 4A-4E, several possible configurations of a target specimen container, indicated with a T, and its neighboring specimen containers 102 to the left and right along a line of action are shown. The line of action is shown horizontal, but vertical and diagonal lines of action may also use this rank order method. In rank ordering, some of these configurations may be given a relatively high numerical score (i.e., indicating a target specimen container T involved in this configuration should be picked first or given precedence), and some configurations are given a relatively lower numerical score (i.e., indicating a target specimen container T involved in this configuration should be picked later or last). For example, in FIG. 4A, a best possible configuration is shown wherein the receptacles 106R on either side of the target specimen container T are empty (indicated with an X). This configuration may be given a numerical score of 10, or another relatively high numerical score. This target specimen container T may be selected first for a pick operation.

Figure 4A:
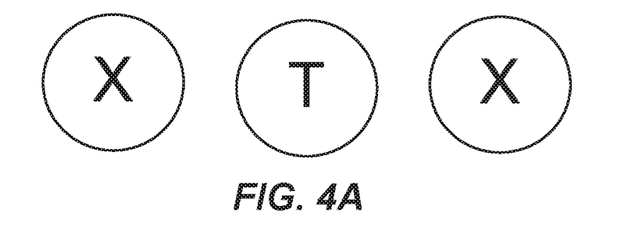
FIGS. 4A-4E illustrate schematic diagrams showing various specimen container population scenarios according to one or more embodiments.
Figure 4B:
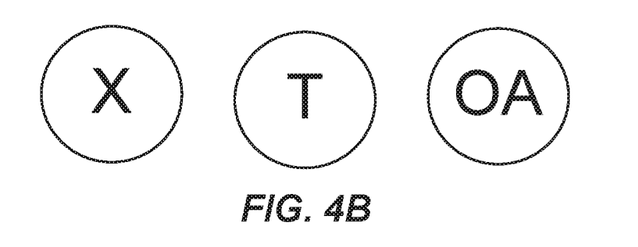

However, the configuration shown in FIG. 4B may be given a relatively lower numerical score, such as of 9. The target specimen container T has only one neighboring specimen container, and the neighboring specimen container 102 is offset away (indicated by "OA"), so the clearance between the target specimen container T and its neighbor may still meet the minimum threshold clearance and the target specimen container T may still be quite accessible.

Figure 4C:
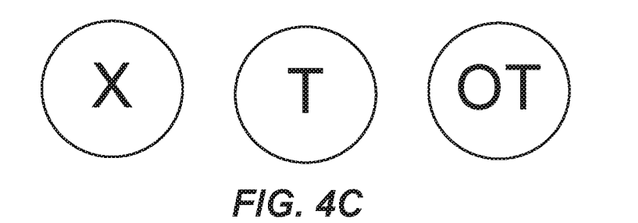

In FIG. 4C, a configuration is shown which includes the target specimen container T having one empty receptacle (X) to its left and one receptacle 106R to its right containing a specimen container 102 which is offset towards the target specimen container T (indicated with an "OT"). This may be given a relatively lower score such as 8.

Figure 4D:
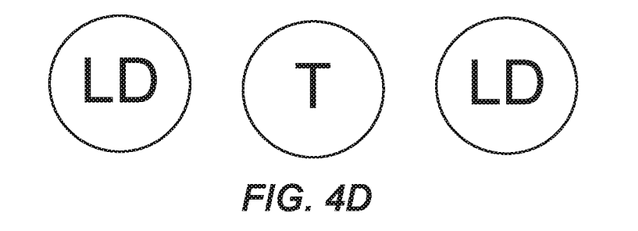
Figure 4E:
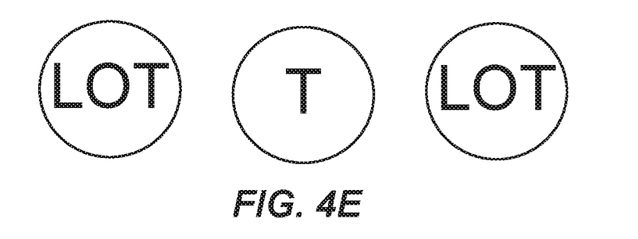

In FIG. 4D, a configuration is shown which includes the target specimen container T having two full receptacles 106R on both its right and left, and both of the receptacles 106R contain centered specimen containers 102 of a relatively larger diameter (indicated with an "LD"). The configuration in FIG. 4D may be given a relatively lower score compared to the configuration in FIGS. 4A-4C, such as a score of 7 because of the lower clearance offered by the larger diameter specimen containers LD.

In cases like in FIGS. 4B and 4C, biasing the gripper fingers 212A, 212B in X and/or Y may create the minimum threshold clearance for the target specimen container T to be considered accessible. In the configuration in FIG. 4E, the gripper fingers 212A, 212B may not be biased because the target specimen container T is surrounded by two specimen containers LOT that are leaning and offset towards the target specimen container T. Thus, there may not be the minimum threshold clearance between the target specimen container T and its neighboring specimen containers LOT, and the target specimen container T may be considered "blocked." This configuration may be assigned a relatively lower score, such as of a 1, or any other relatively lower score, that may indicate a "blocked" condition. Accordingly, the target specimen container T may be picked after other specimen containers LOT have been picked, thus freeing up area surrounding it.

Using rank ordering, a dynamic order in which to pick specimen containers 102 may be determined based on the "most accessible" receptacles 106R i.e., receptacles 106R given a higher rank value being picked first. Likewise, a dynamic order in which to pick specimen containers 102 may be determined without rank ordering and simply by determining which of the receptacles 106R meet a minimum threshold clearance between the specimen container 102 contained in the receptacle 106R and neighboring specimen containers 102, i.e., which of the receptacles 106R are accessible, and which receptacles 106R are blocked. The dynamic order may be determined by surveying all of the available receptacles, those in a region, or by surveying each one individually and determining if they meet the minimum clearance criteria set for the gripper fingers 212A, 212B and sample rack 106 used. In some embodiments, the minimum clearance threshold may be set based upon experimental runs to ensure lack of contact on a high percentage of pick and place operations.

Dynamic selections of accessible target receptacles for sequential place operations may be made using the system and method described above. To determine if the receptacle 106R is accessible, population data, configuration data, or a combination of the two may be used, in a similar manner as with place operations. Population data refers to data on which of the receptacles 106R are empty, and may be used to determine a target receptacle 106R into which a specimen container 102 is desired to be placed. Configuration data refers to information on a specific neighboring specimen container 102, including maximum specimen container diameter, specimen container offset distance, or tube type (e.g., capped tube, uncapped tube, tube-top sample cup, and the like). Configuration information from a previous pick operation may also be stored in the image capture controller 224 and may be able to be accessed by the robot controller 216 during a subsequent place operation. This allows the place strategy to be configured in a way that allows for maximum clearance between neighboring specimen containers 102. For example, the place strategy can be configured to avoid placing two specimen containers 102 of a relatively larger diameter in receptacles 106R next to each other. Likewise, specimen containers 102 including tube-top specimen containers may be placed away from large specimen containers 102L. Similarly, dynamic placement may be made in every other row or column to initially increase placement clearance.

Consider the sample rack 106 in FIG. 3B, having multiple rows of receptacles 106R (rows 6 through 9 shown), some of which contain specimen containers 102, 102L. For example, a pre-determined order may comprise starting at the first receptacle 106R (A6) in row 6. Population data indicates that receptacles 106R labeled A6 and E6 are empty, and that the receptacles 106R labeled B6, C6, D6 and E6 contain specimen containers 102, 102L. Thus, from the population and configuration data, it can be determined that receptacles 106R labeled A6 and E6 are both accessible. Accessibility can be determined by ensuring that both sides along a particular line of action practicable by the gripper 212 meet the minimum clearance. Therefore, a place order can be determined based on whether a receptacle 106R is accessible. In some embodiments, if a receptacle 106R is not accessible, the place operation may skip over that receptacle 106R and be placed in the next accessible receptacle 106R based on imaging data. The next pick move may attempt to unblock the receptacle 106R found not to be accessible.

Figure 5:
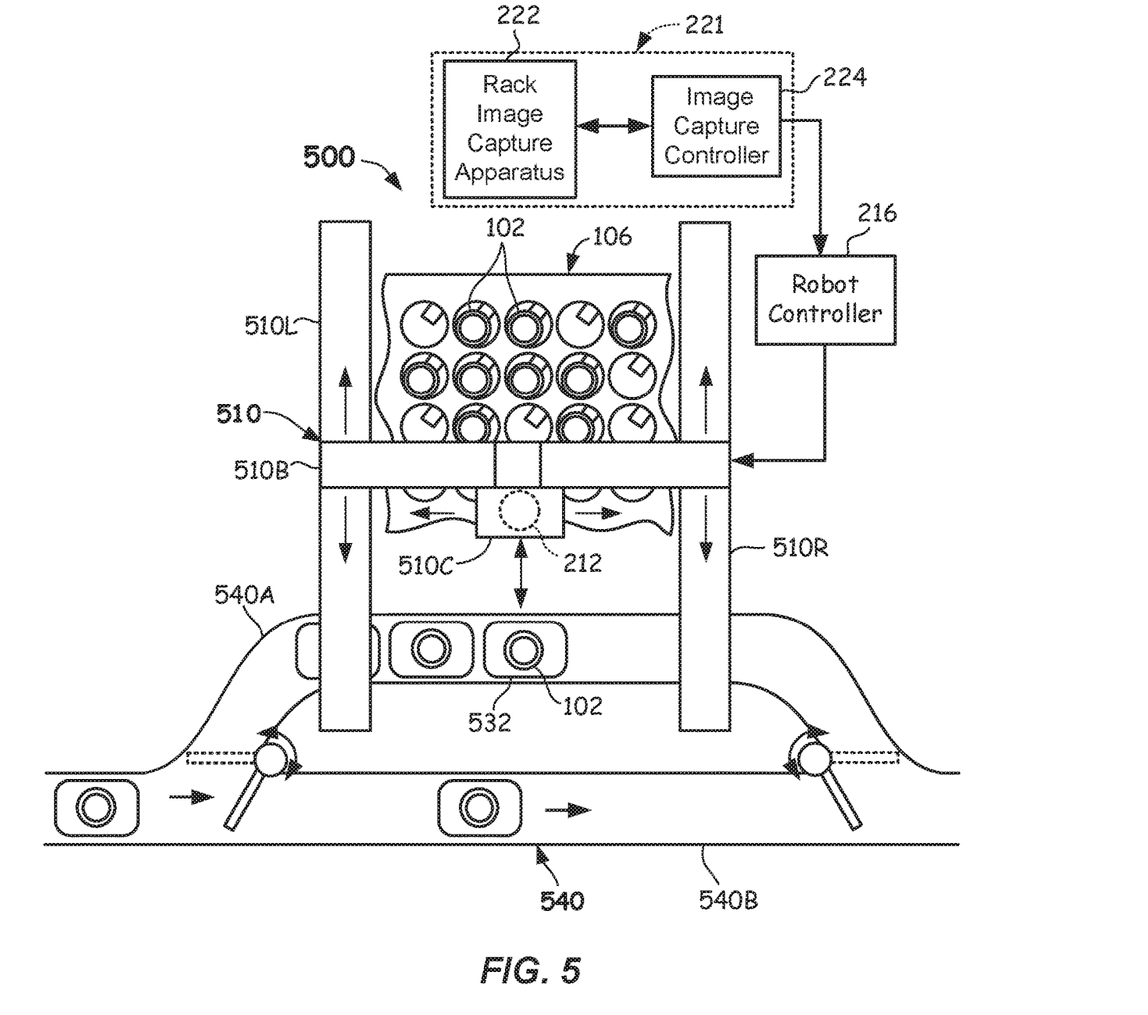
FIG. 5 illustrates a schematic top view of a specimen container transport system configured to perform a dynamic gripper finger positioning method according to one or more embodiments.

FIG. 5 illustrates a specimen container transport system 500 in which the dynamic selection method may be practiced. The specimen container transport system 500 includes a sample rack 106 provided within the access of a gripper 212 (shown dotted). The gripper 212 may be mounted to a cross slide 510C of a gantry robot 510, which can be moved back and forth on a cross beam 510B to access any column of the sample rack 106. Likewise, the cross beam 510B may move forward and backward along the left and right slide rails 510L, 510R to allow access to any row of the sample rack 106. The gripper may be moved vertically (into and out of the paper) to raise and lower the specimen containers 102. Thus, the gripper 212 may be moveable in an X, Y, Z coordinate system. A dynamic pick operation may be made according to the method described above to pick specimen containers 102 from the sample rack 106 and transport them to specimen container carriers 532 (e.g., pucks) that reside on, and move around, track 540 based on imaging data obtained from the rack image capture apparatus 222 and image capture controller 224. Likewise, the specimen containers 102 may be placed, using a dynamic place operation, back into the sample rack 106 upon returning from testing and/or processing. The selection of pick and place sequences may be as described above and may be based on population data, configuration data, or both. Track 540 may transport the specimen containers 102 to various pieces of equipment or instrument(s) to preform testing or otherwise process specimens contained in the specimen containers 102. Track 540 may include one or more offshoots 540A from a main channel 540B to all loading and unloading. In some embodiments, dynamic placement may include a strategy that returns certain specimen container carriers 532 in a specified order so that a placement strategy that increases placement clearance in the sample rack is provided.

Figure 6:
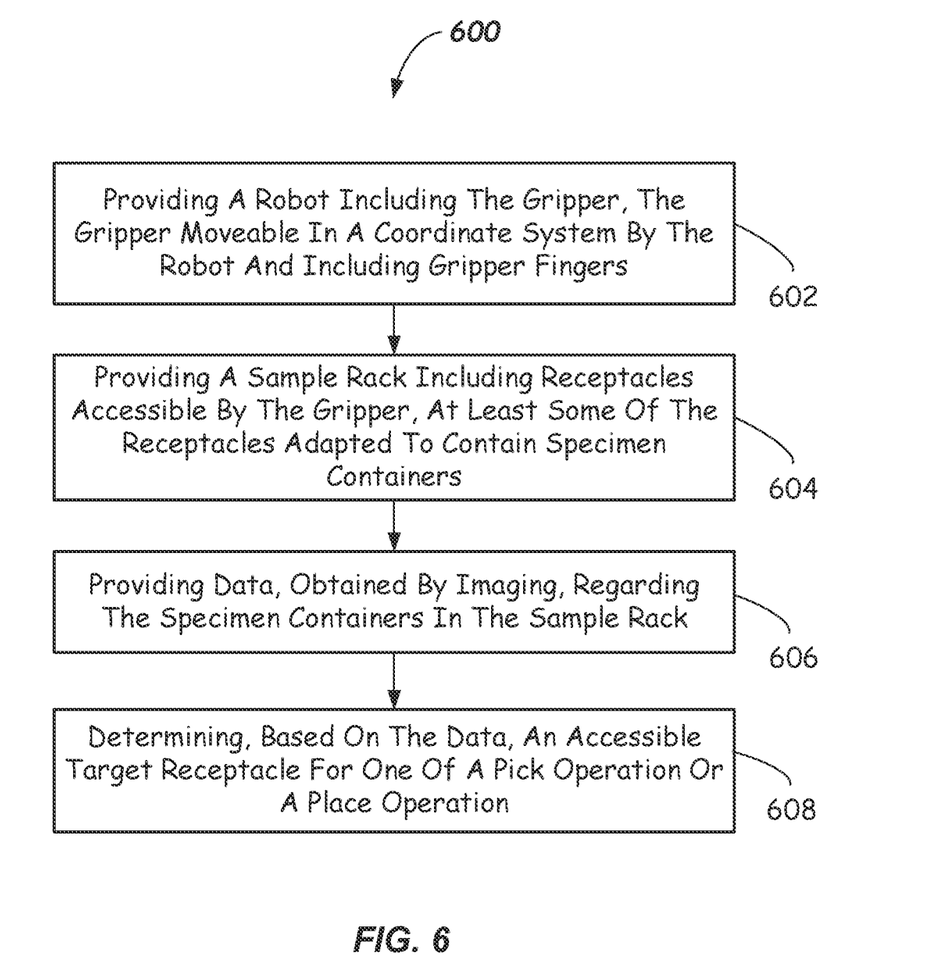
FIG. 6 illustrates a flowchart of a method of operating a gripper according to embodiments.

In accordance with another embodiment of the disclosure, a method 600 of operating a gripper (e.g., gripper 212) is provided. The method 600 includes, in 602, providing a robot (e.g., robot 210, 510) including the gripper (e.g., gripper 212), the gripper moveable in a coordinate system (e.g., in X, Y and Z) by the robot and including gripper fingers (e.g., gripper fingers 212A, 212B), and in 604, providing a sample rack (e.g., sample rack 106) including receptacles (e.g., 106R, 106T) accessible by the gripper, at least some of the receptacles adapted to contain specimen containers (e.g., 102, 102L, 102T).

Further, in 606, the method 600 includes providing data, obtained by imaging, regarding the sample rack (e.g., sample rack 106) and the specimen containers (e.g., specimen containers 102, 102L), and lastly, in 608, determining, based on the data, an accessible target receptacle (e.g., 106T) for one of a pick operation or a place operation. The data, obtained by imaging, may be population data and/or configuration data. Determining an accessible target receptacle (e.g., 106T) may include testing a clearance between the target specimen container 102T and a surrounding specimen container 102, 102L in the case of a pick operation to make sure the minimum threshold clearance is provided. In the case of a place operation, accessibility involves determining a clearance around the target receptacle (e.g., 106T) and comparing that clearance to a target threshold value based on the type of specimen container 102 being placed and possibly the type of specimen containers surrounding the target receptacle 106T.

While specific apparatus, system, and methods have been shown by way of example embodiments herein, it should be understood that other and different embodiments are possible. It is intended that the disclosure is to cover all modifications, equivalents, and alternatives falling within the scope of the appended claims.

What is claimed is:

1. A method of operating a gripper, comprising:
   providing a robot including the gripper, the gripper moveable in a coordinate system by the robot and including gripper fingers;
   providing a sample rack including receptacles accessible by the gripper, at least some of the receptacles adapted to contain specimen containers;
   providing data, obtained by imaging, regarding the sample rack and the specimen containers; and
   determining, based on the data, an accessible target receptacle for one of a pick operation or a place operation, wherein the accessible target receptacle is a receptacle that meets a threshold minimum clearance around the receptacle and along a line of action of opening and closing the gripper fingers relative to the receptacle.

2. The method of claim 1, wherein for the place operation the accessible target receptacle is empty.

3. The method of claim 2, comprising placing a target specimen container in the accessible target receptacle.

4. The method of claim 1, wherein for the pick operation the accessible target receptacle contains a target specimen container.

5. The method of claim 4, wherein the accessible target receptacle is a receptacle which meets the threshold minimum clearance around the receptacle and along a line of action of opening and closing the gripper fingers relative to the target specimen container.

6. The method of claim 5, comprising the gripper having rotational capability and more than one line of action of opening and closing the gripper fingers.

7. The method of claim 6, including determining whether more than one line of action of opening and closing the gripper fingers meets the threshold minimum clearance.

8. The method of claim 1, further comprising:
   determining if one or more of the receptacles is blocked from access such that the gripper fingers cannot be inserted without contacting one or more specimen containers surrounding the receptacles that are blocked.

9. The method of claim 1, wherein the data comprises population data, which indicates the receptacles that include specimen containers.

10. The method of claim 9, wherein the accessible target receptacle is determined based at least in part on population data.

11. The method of claim 1, wherein the data comprises configuration data including information on a geometry or orientation of one or more specimen containers resident in the sample rack.

12. The method of claim 11, wherein the configuration data comprises one or more from a group of: maximum specimen container diameter, specimen container offset distance, or tube type.

13. The method of claim 12, wherein the accessible target receptacle is determined based at least in part on configuration data.

14. The method of claim 1, wherein the accessible target receptacle is determined based on population data and configuration data, wherein the configuration data includes information on a geometry or orientation of one or more specimen containers resident in the sample rack.

15. The method of claim 1, comprising making further dynamic selections of additional accessible target receptacles for subsequent pick or place operations based on the data.

16. The method of claim 1, wherein the accessible target receptacle is determined by rank ordering at least some of the receptacles, based on both configuration data and population data, wherein the configuration data includes information on a geometry or orientation of one or more specimen containers resident in the sample rack.

17. The method of claim 1, wherein the accessible target receptacle is selected to include a first empty receptacle and a second empty receptacle on opposite sides of the accessible target receptacle.

18. The method of claim 1, further comprising blocked receptacles such that the gripper fingers cannot be inserted into the blocked receptacles without contacting one or more specimen containers surrounding the blocked receptacles, wherein at least one of the specimen containers surrounding at least one of the blocked receptacles is removed to unblock the blocked receptacles.

19. A gripper positioning system, comprising:
 a robot including a gripper, the gripper moveable in a coordinate system by the robot and including gripper fingers;
 a sample rack including receptacles accessible by the gripper fingers, at least some of the receptacles containing specimen containers; and
 a controller coupled to the robot and operatively configured to:
  access data obtained from one or more images regarding the sample rack and the specimen containers, the data including population data and configuration data, wherein the configuration data includes information on a geometry or orientation of one or more specimen containers resident in the sample rack, and
  determine, based on the population data and configuration data, an accessible target receptacle for one of a pick operation or a place operation, wherein the accessible target receptacle is a receptacle which meets a threshold minimum clearance around the receptacle and along a line of action relative to the receptacle.

20. A gripper positioning apparatus, comprising:
 a robot including a gripper, the gripper moveable in a coordinate system by the robot and including gripper fingers; and
 a controller coupled to the robot and operatively configured to:
  access data obtained from one or more images, regarding a sample rack and specimen containers contained therein, and
  determine, based on the data, an accessible target receptacle for one of a pick operation and a place operation, wherein the accessible target receptacle is a receptacle which meets a threshold minimum clearance around the receptacle and along a line of action relative to the receptacle.

* * * * *